United States Patent [19]

Stahmann

[11] 3,975,546

[45] Aug. 17, 1976

[54] COAGULATION OF PROTEIN FROM THE JUICES OF GREEN PLANTS BY FERMENTATION AND THE PRESERVATION THEREOF

[76] Inventor: Mark A. Stahmann, 939 University Bay Drive, Madison, Wis. 53705

[22] Filed: Jan. 23, 1975

[21] Appl. No.: 543,468

[52] U.S. Cl. .................. 426/49; 426/52; 426/53; 426/54; 426/655; 260/112 R
[51] Int. Cl.² .............. A23J 1/00; A23K 1/14; A23L 1/20; A23L 1/212
[58] Field of Search ............ 426/49, 51, 52, 53, 426/54, 60, 46, 634, 635, 636, 655; 195/4, 5; 260/112 R

[56] References Cited
UNITED STATES PATENTS

| | | | |
|---|---|---|---|
| 2,600,903 | 6/1952 | Miller | 426/311 |
| 3,420,676 | 1/1969 | Keitel | 426/51 |
| 3,637,396 | 1/1971 | Hallo et al. | 426/51 |
| 3,684,520 | 8/1972 | Bickoff et al. | 426/270 |

FOREIGN PATENTS OR APPLICATIONS

| | | | |
|---|---|---|---|
| 511,525 | 8/1939 | United Kingdom | 426/54 |

*Primary Examiner*—A. Louis Monacell
*Assistant Examiner*—Esther L. Massung
*Attorney, Agent, or Firm*—Andrus, Sceales, Starke & Sawall

[57] ABSTRACT

The invention relates to a novel method to precipitate and preserve protein from the juice expressed from green leafy plants by coagulating the protein in the juice through an anaerobic fermentation process utilizing the microorganisms naturally resident on the leaves of the green plants. In addition part of the carbohydrates and non-protein nitrogen in the juice is converted into bacterial protein which increases the amount of protein obtained from the juice and particularly prevents oxidative destruction of cystine and methionine and thereby increases these limiting amino acids in the obtained protein.

11 Claims, 8 Drawing Figures

COAGULATION OF PROTEIN FROM THE JUICES OF GREEN PLANTS BY FERMENTATION AND THE PRESERVATION THEREOF

BACKGROUND OF THE INVENTION

The protein in fresh green plant tissues normally is separated from the fiber by mechanical crushing of the plant cell walls by hammer mills, rollers, screw presses or the like and squeezing the green juice from the plants.

Thereafter under prior practices the protein in the juice has been separated from the water in the juice by heating the juice to about eighty degrees C. or by adding mineral acids or organic solvents which coagulated the protein. The protein coagulum was then collected, by filtering or centrifuging. The usual procedure used prior to the present invention, including heating and the addition of solvents for obtaining protein from green plants is disclosed in a book by N. W. Pirie, Blackwell Scientific Publications, Oxford, 1971 entitled *Leaf Protein, Its Agronomy, Preparation, Quality and Use*.

The heating of the plant juice is expensive as is the addition of acid or organic solvents and in addition considerable equipment and energy is required to carry out the process by the heating method. The invention is directed to less expensive apparatus and process to coagulate and preserve the protein in the green juice expressed from green plants and to separate the protein from most of the water in the juice.

SUMMARY OF THE INVENTION

In general, the invention consists of subjecting the juice expressed from fresh green plant tissues to a generally short anaerobic fermentation in which organic acids are formed from the carbohydrates in the juice. The fermentation is normally effected by the microorganism naturally resident on the green leafy plants which are carried into the juice and is usually accomplished in the anaerobic atmosphere of a sealed fermentation tank. The formed acid lowers the pH of the juice and causes the protein to coagulate. At the same time, some of the undesirable chlorophyl and saponin glycosides or other toxic substances in the juice are destroyed. Under the anaerobic conditions there is also less oxidation of unsaturated fats and phenols than is the case when the juices are heated. These oxidations will produce an unpleasant, rancid taste and lowers the nutritive value of the proteins. Also during the anaerobic fermentation some of the soluble carbohydrates and non-protein nitrogen in the juice are converted into bacterial protein. This bacterial protein is high in cystine and methionine which are the limiting amino acids in leaf protein. Furthermore the oxidative destruction of these amino acids which occurs when the juice is heated in the presence of oxygen is avoided and thus the value of the protein concentrate as a feed or food is raised.

Increase in the speed of the fermentation process is accomplished by retaining some of the fermentation mixture obtained from the previous day's fermented green juice in the fermentation tank to inoculate the next load of juices supplied to the tank or by adding an inoculum containing acid-forming anaerobic bacteria.

After the protein has coagulated in the fermentation tank it may be removed therefrom as a liquid slurry or silage to a storage or preservation tank which also is sealed against the entry of air. The coagulated protein settles to the bottom of the tank and may be removed and used as an animal feed supplement. The supernatant or de-proteinized liquid which collects in the top portion of the storage tank is drawn off and can be used for fertilizer. Conversely, the fermentation and preservation tanks may be combined into a single unit as illustrated in a second embodiment of the invention.

DESCRIPTION OF THE PREFERRED EMBODIMENTS

The process and system described are directed to the coagulation of proteins obtained from the green juice expressed from alfalfa plants but the proteins may also be obtained from the juice of other green plants such as those set forth in Table 1 hereinafter.

The alfalfa 1 from which the proteins are to be obtained is normally chopped in the field and loaded on a wagon and is then loaded into the extractor 2 which is shown as a set of rollers to rupture the cells and squeeze out the juice and fibrous residue. Other equipment like a screw press which would accomplish the same result could also be employed.

It has previously been observed that when the fresh green juice was allowed to stand, there is some coagulation of the protein. However this has not been a basis for the separation of the protein from the water in the juice for when the juice is left standing in contact with the oxygen in the air, aerobic bacteria and molds rapidly grow. The molds often produce toxic mycotoxine. Furthermore, aerobic bacteria which grow in the juice in the presence of air cause undesirable putrifactive changes in the juice. When left standing in contact with air, the pH of the plant juice begins to rise as ammonia and amines are formed. The juice soon spills and becomes unsuitable for feed and food.

Figure 1:
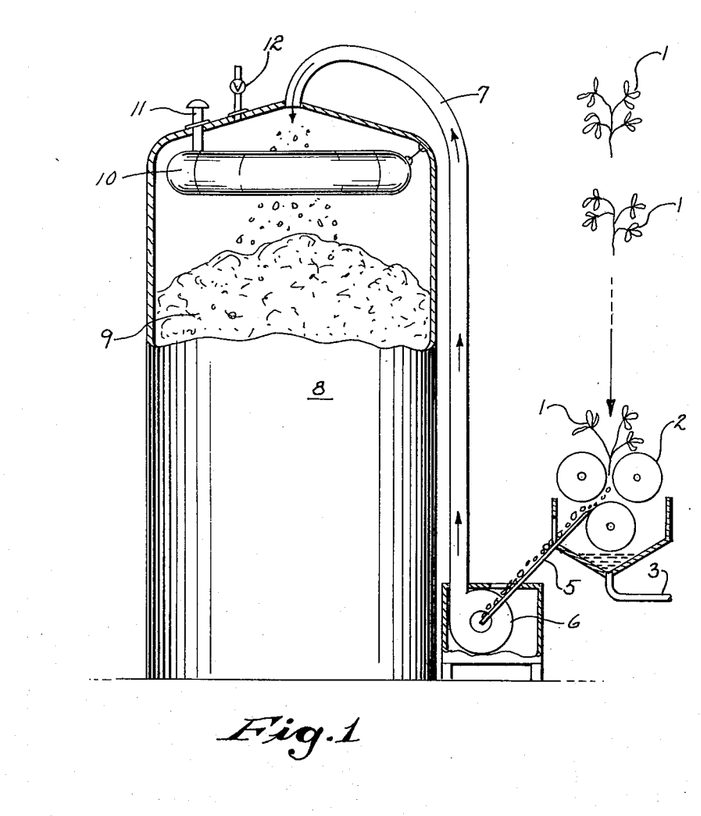
FIG. 1 is a longitudinal sectional view of a large storage structure and a roller press with parts shown schematically.
Figure 2:
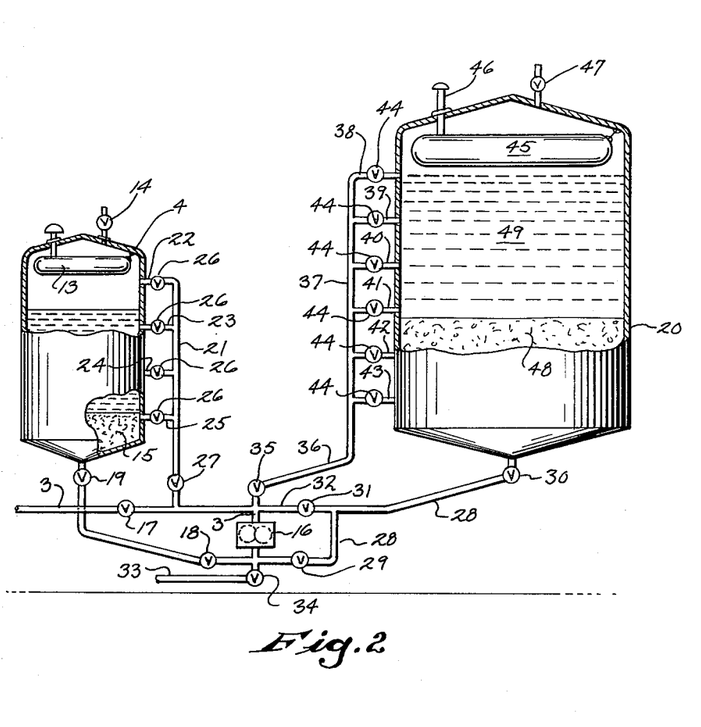
FIG. 2 is a view similar to FIG. 1 and illustrates a small anaerobic fermentation tank and a large anaerobic storage tank with valved connections.
Figure 3:
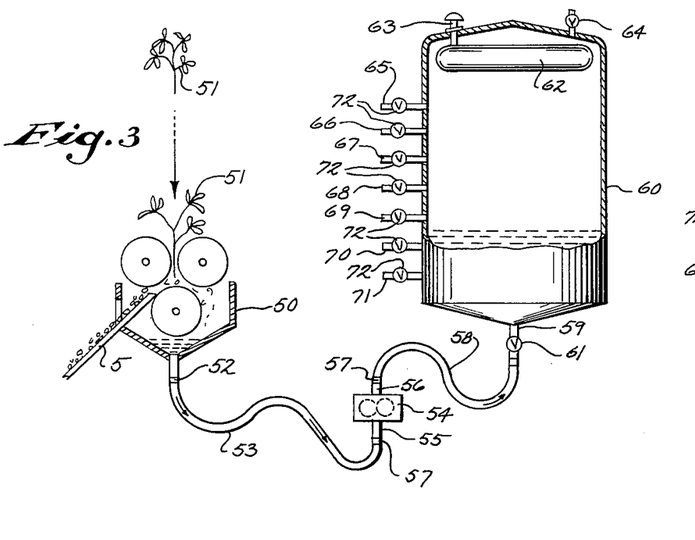
FIG. 3 illustrates a second embodiment of the invention which shows an extractor and a single tank is shown in elevation which is employed as a fermentation tank and an anaerobic storage or preservation tank.

However if the fresh juice is placed under anaerobic conditions and oxygen is excluded, anaerobic bacteria which are resident on the leaf surface of the green plants such as alfalfa 1 are carried into the juice and begin to multiply. These produce organic acids and the pH drops from about 6 to between pH 4 and 5. Molds do not grow at this low pH and in the absence of oxygen. Consequently after the juice is separated from the alfalfa 1 it is pumped or conveyed by gravity from extractor 2 through conduit 3 to the oxygen free fermentation and sometimes preservation tank 4. At the same time the pressed forage from which the juice has been separated is conveyed by conveyor 5 to a blower 6 which loads the forage through pipe 7 into the top of the forage storage tank 8 from whence it may be fed to livestock. Although some of the proteins have been removed from the green juice extracted from the alfalfa, sufficient remains in the pressed forage stored in tank 8 to provide the nutrients required for ruminant animal feed. FIG. 1 illustrates the forage 9 stored in tank 8. Tank 8 is sealed against the entry of air and may be provided with a breather bag 10 such as that illustrated in U.S. Pat. No. 3,193,058. Bag 10 is supported from the roof of tank 8 and has a pipe 11 connected to the bag and extending through the roof of tank 8. Under conditions of a sudden temperature change a decrease in internal pressure to a point below atmospheric any air tending to flow into the structure flows instead into bag 10 and expands it within tank 8. Conversely with a rise in temperature causing an increase in internal pressure the bag 10 is deflated and the air in the bag is forced out through pipe 11. Two way valve 12 may also be provided as a relief valve for passage of air into or gases out of the structure when unusual pressure differentials may occur.

The fermentation tank 4 is sealed against the entry of air and may be initially purged with inert gases such as carbon dioxide and nitrogen or during filling so that an anaerobic atmosphere is maintained in tank 4 when the green plant juices are stored in the tank for anaerobic fermentation.

The sealing of tank 4 against the entry of air may be accomplished by a floating cover, not shown, such as is employed in hydrocarbon storage tanks or equipped with a breather system such as that employed in the forage storage tank 8. This consists in general of the bag 13 connected through the top of the tank 4 to the atmosphere so that air can enter bag 13 and be expelled therefrom with changes in the differential in pressure between outside air and gases inside tank 4 due to temperature changes. A valve 14 may also be connected to tank 4 so that in the event of unusual changes in pressure bag 13 will be protected against excessive inflation.

It has been found that it is desirable that tank 4 be of a size to hold the green juices from one day's harvest or of a size to receive the green juice from a single cutting of a forage crop. Anaerobic fermentation of the juices preferably occurs in a period of approximately 24 hours.

In order to initiate and carry out the anaerobic fermentation process it is desirable that an inoculum be present in the fermentation tank 4. As a source of inoculum for the fermentation of the plant juices in tank 4 there are the microorganisms naturally resident on the leaves and stems of the green plants. Enough bacteria and yeasts are usually present in the expressed juice of fresh green plants to cause anaerobic fermentation of the juice provided the juice is placed under suitable conditions so that there is a growth of acid producing bacteria which lowers the pH of the stored juice and coagulates the protein in 2 or 3 days. However, because the material inoculum in the leaf surface is limited and varies with the plant and weather conditions, the best results are obtained when the fresh juice is inoculated with about 10 to 30 percent of the volume of juice that has already undergone the anaerobic fermentation for one or two days and which has a pH between 4.5 and 5.0. A small supply of this inoculum 15 can be retained in tank 4 preferably in the bottom of tank 4 as illustrated in the drawings or supplied thereto from another source. The retained inoculum 15 is rich in anaerobic acid forming bacteria which will cause a more rapid anaerobic fermentation so that the pH drop and protein coagulation can normally be completed within 24 hours. It is also possible to add an inoculum from a tank culture or synthetic medium which contains cells or spores of acid forming anaerobic bacteria.

During the fermentation process proteins in the juice in tank 4 tend to coagulate or form into a curdlike state.

The protein coagulum prepared by anaerobic fermentation is more soluble when the pH is raised than the coagulum prepared by heat coagulation. Heat coagulation causes denaturation of the protein and the protein becomes insoluble. The fermentation does not denature all the protein, hence the protein from the anaerobic fermentation process has better functional properties than that prepared by heat coagulation.

The protein coagulum produced by anaerobic fermentation also has a better taste than the uncoagulated green juice or the coagulum obtained by heating the juice. It is more readily eaten by monogastric animals including swine and chickens.

The conduit 3 leading to the bottom of tank 4 from extractor 2 extends through the reversible pump 16 accomplished through valving within the pump and which is actuated to pump the green juices in conduit 3 into fermentation tank 4. Conduit 3 is provided with valves 17, 18 and 19 which when opened control the flow of the juices through conduit 3 to fermentation tank 4.

Upon completion of the anaerobic fermentation process in tank 4 which occurs as previously described, the protein coagulum thereby formed in the form of a liquid silage is conveyed to the sealed storage structure 30. A header 21 is connected to fermentation tank 4 at different levels by short conduits 22, 23, 24 and 25 respectively, each conduit having a valve 26.

Header 21 is joined to conduit 3 at a connection located just before conduit 3 conducts green juices through pump 16 and valve 27 is located adjacent to the connection of header 21 to conduit 3. When the protein coagulum is to be discharged from fermentation tank 4 to sealed storage structure 20, the valves in conduit 3 are closed. In turn valve 27 is opened and the valve 26 in conduit 24, for example, is opened and pump 16 is actuated. The protein coagulum then flows through conduit 24 and header 21 into conduit 3 and through pump 16. A conduit 28 is connected to the discharge side of conduit 3 and leads to the bottom of storage tank 20 for flow thereto of the protein coagulum. At this time the valves 29 and 30 located in conduit 28 are open and the valve 31 in the conduit 32 connected to conduit 3 is closed.

When conduit 3 is being used to fill fermentation tank 4 with green juice or for conveying of the protein coagulum to conduit 28 and then to storage tank 20, the discharge conduit 33 connected to conduit 3 and leading from pump 16 is closed by valve 34. Likewise the valve 35 is closed in conduit 36 leading from the header 37 which is connected to the storage tank 20 by short pipes 38, 49, 40, 41, 42, 43 which are secured to the tank 20 at different levels. Each of the short pipes has a valve 44 to control flow through the respective pipes.

The storage structure is also designed to be sealed against the entry of oxygen as is crop storage tank 8 so that an anaerobic atmosphere can be maintained therein. Consequently storage structure 20 is protected against entry of air by change in pressure differentials between the outside atmosphere and the gases in the structure such as by a breather bag 45 which is suspended within the upper end of structure or tank 20 and connected to the atmosphere by the pipe 46 extending through the roof of the structure. A relief valve 47 is also employed with tank 20 to prevent excessive inflation of breather bag 45 in the event of unusual changes in pressure differential between the inside and outside atmosphere to which tank 20 is subjected.

In the storage tank 20 the protein coagulant 48 as illustrated in the drawings tends to settle to the bottom of tank 20 as a sludge and the supernatant or de-proteinized liquid 49 collects in the upper portion of the tank.

The liquid 49 is drawn off from the upper portion of tank 20 through one of the pipes 38, 39 or 40. For example, if the valves 44, 35 and 34 are opened and pump 16 started, liquid 49 will then pass to header 37, thence through conduit 36, conduit 3 through pump 16 and be discharged from conduit 33 such as to a tank truck or feed lot not shown. Liquid 49 contains minerals and some protein and when drawn off and received in a tank truck may be used as fertilizer.

In turn the protein sludge 48 may be drawn off in a similar path by opening valve 44 in either of the conduits 42 or 43. Likewise upon the opening of valves 30, 31 and 34 and the starting of pump 16 the sludge may be discharged from the cone-shaped bottom of tank 20 through conduits 28 and thence through conduit 3 and pump 16 and leave the system through conduit 33. The protein sludge is a slurry-like substance and may be used as a feed supplement with corn silage, shelled corn or reconstituted dry grain or any feed materials which are deficient in protein. Other types of draw off may be employed such as directing flow of the liquid 49 by a conduit directly to a manure spreader or the like where a vacuum pump, not shown, or gravity may draw the liquid from the structure.

In the second embodiment of the invention there is shown the extractor 50 corresponding to extractor 2 of the first embodiment into which green plants 51 such as alfalfa are deposited after cutting and the plants are then pressed to rupture the cells and squeeze out the juice and fibrous residue.

As in the first embodiment a conveyor 5 conveys the pressed fibrous residue to a blower and thence a sealed storage tank such as blower 6 and tank 8 as is shown in FIG. 1 of the first embodiment.

The extractor 50 may be of cone shape at the bottom and has an extension in the bottom containing the hose connection 52 to which may be connected the flexible hose or conduit 53. Adjacent to extractor 50 may be located the reversible pump 54 and pump 54 is provided with the lower fixed conduit 55 and upper fixed conduit 56, each of which is provided with the hose connection 57. The flexible conduit 53 leading from extractor 50 is connected to the lowermost hose connection 57 of the pump and another flexible conduit 58 is connected at one end to the uppermost hose connection 57 and the other end of the conduit 58 is secured to the hose connection secured to a fixed conduit 59 extending from the bottom of the fermentation and preservation tank 60. Conduit 59 has a valve 61 in it for opening and closing the conduit.

Consequently when the fresh green juice extracted from plants 51 is to be transferred to tank 60 flexible conduits or hoses 53 and 58 are connected to their respective hose connections, valve 61 is opened and pump 54 is started. The juice then flows through hose 53, pump 54 and hose 58 into the bottom of tank 60. The fresh juice is thereby mixed with inoculum which is juice which has previously been fermented and retained in tank 60.

The fermentation and preservation tank is a combination of the fermentation tank 4 and the preservation tank 20 illustrated in the first embodiment of the invention and consequently will be more like the size of the storage or preservation tank 20 than the fermentation tank 4.

As with tanks 4 and 20, the anaerobic atmosphere is maintained within tank 60 by preventing the entry of air. Again this may be done by a floating cover, not shown, or as with tanks 4 and 20, a breather bag 62 which is suspended inside the tank 60 from the roof and connected to the outside atmosphere by pipe 63 so that the pressure differential between the gas inside the tank and the outside atmosphere can be compensated for to prevent ingress of air to the inside of tank 60. A relief valve 64 is connected to tank 60 to permit entry of air or exit of gases in the event of extreme temperature changes.

Tank 60 is provided with a number of inlet conduit connections 65 - 71 each of which has a valve 72 for opening and closing the conduit.

Figure 4:
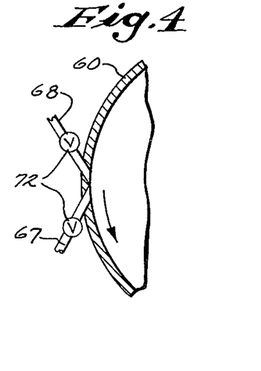
FIG. 4 is a top plan view illustrating two of the conduit connections to the tank of FIG. 3.

The conduit connections 65 –71 are preferably located on an oblique angle relative to tank 60 as illustrated in FIG. 4 so that a slow rotation can be obtained within tank 60, with the respective conduit connections in some cases acting as inlets and other cases as outlets. Conduits 67 and 68 are shown in FIG. 4 to illustrate the oblique orientation of the connections.

Should it be desirable the flexible hose 58 may be connected to any of conduit connections 65 –71 for filling of tank 60 with fresh juice. This is not shown in the drawings.

Figure 5:
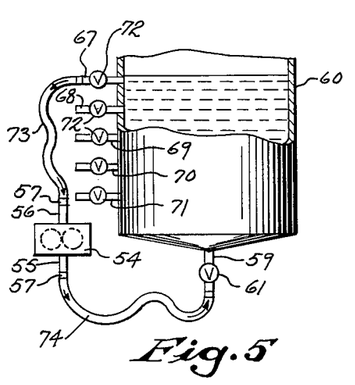
FIG. 5 is a longitudinal sectional view of the lower portion of the combination fermentation and storage tank illustrating a construction for regulating the flow in the fermentation and storage tank for occasional mixing to aid fermentation.
Figure 6:
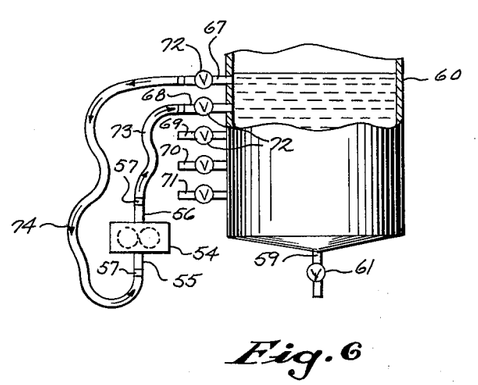
FIG. 6 is a view similar to FIG. 4 in which a construction is illustrated for regulating the flow to induce rotation of the contents to aid in settling of the protein sludge.

FIGS. 5 and 6 of the drawings illustrate the mixing operation which may be carried out in tank 60.

In FIG. 5 where a partial view of tank 60 is shown, the flexible hose 73 is connected at the upper end to conduit connection 67 at one end and at the other end to the upper conduit 56 of pump 54. A second flexible hose 74 is connected to the lower conduit 55 of pump 54 and to the fixed connection 59 at the bottom of tank 60. When valves 72 and 61 are opened and pump 54 is started, flow of the stored sludge from tank 60 occurs through connection 67, through the described hoses 73 and 74 and pump 54 and through connection 59 into the bottom of tank 60. This provides for occasional or intermittent mixing to aid the fermentation in the anaerobic atmosphere in the tank and to remove foam. The flow may be reversed by reversing pump 54.

In FIG. 6 the upper end of flexible hose 73 is connected to conduit connection 68 and to the upper conduit 56 of pump 54. The flexible hose 74 is connected to conduit connection 67 at one end and at the other end to the lower conduit 55 of pump 54. In the illustration in FIG. 6 when the valves in conduit connections 67 and 68 are open and the pump 54 is started flow from tank 60 of the stored material begins in hose 74 passes through pump 54 and then back into tank 60 through hose 73 and conduit connection 68. This described flow is for the purpose of rotation of the contents of the tank to aid in settling of the protein sludge in tank 60. The flow may be reversed by reversing pump 54 and the rotation of the contents is readily accomplished by the oblique conduit connections as illustrated in FIG. 4.

In the flows of tank contents described with respect to FIGS. 5 and 6, the best results will be obtained if the flow is restricted to a generally slow flow so that the fermentation process will not be unduly disturbed.

Figure 7:
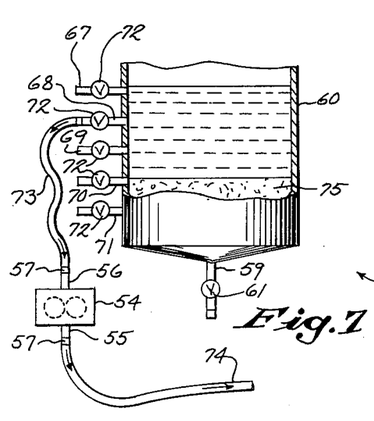
FIG. 7 is a view similar to FIG. 4 in which a construction is illustrated to regulate the flow to remove supernatant.

FIG. 7 illustrates the flow to remove the supernatant liquid which forms in the upper portion of the tank 60 when the protein coagulum 75 settles to the bottom of tank 60 and the anaerobic fermentation process is completed. As illustrated in that figure, the flexible hose 73 is secured at one end to conduit connection 68 and at the other to the upper conduit 56 of pump 54. In turn the hose 74 is connected to the lower conduit 55 of pump 54. When valve 72 in conduit connection 68 is opened and pump 54 is started, the supernatant is pumped from tank 60 and into a tank truck, for example, for distribution on fields as fertilizer or to a feed processing plant.

Figure 8:
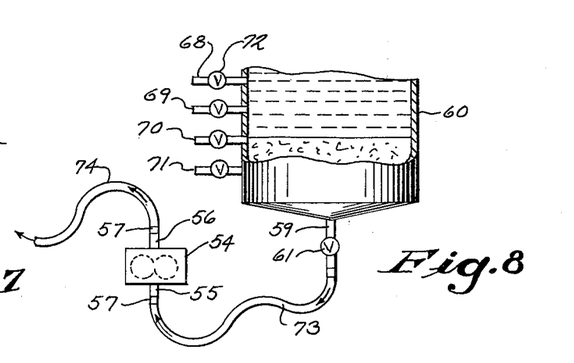
FIG. 8 is a view similar to FIG. 4 in which a construction is illustrated to regulate the flow to remove protein sludge.

FIG. 8 illustrates the flow from tank 60 to remove protein sludge. As illustrated the flexible hose 73 is secured at one end to the fixed conduit 59 at the bottom of tank 60 and connected at the other end to the lower conduit 55 of pump 54. Hose 74 in turn is connected to the upper conduit 56 of pump 54. When valve 61 is opened and pump 54 is started the protein sludge is drawn from the lower portion of tank 60 and pumped to a feed lot or deposited in a tank truck, not shown.

The experiments carried out in developing the invention as set forth in the following tables and examples illustrate the work which has been done to establish that the fermentation process employed to precipitate and preserve protein by the anaerobic fermentation process has many advantages over a process of coagulating the proteins by heat.

In support of the pH statements made in the Examples described hereinafter, is the following table presenting data on the pH change on fermentation of juices from various plants.

Table I

| Plant | pH of Fresh Juice | pH after 24 Hours Fermentation |
| --- | --- | --- |
| Alfalfa | 5.8 – 6.0 | 4.2 – 4.5 |
| Corn | 5.5 | 3.4 |
| Oats | 5.6 | 3.7 |
| Pea Vines | 5.6 | 3.8 |
| Lawn Grass | 5.5 | 4.2 |
| Pangola Grass | 5.7 | 4.2 |
| Brome Grass | 6.0 | 4.0 |
| Elephant Grass | 5.7 | 4.2 |
| Sudan Grass | 5.5 | 3.6 |

EXAMPLE 1

One of the first experiments was carried out by squeezing green juice from the fresh green leaf and stem tissues of alfalfa (Medicago sativa) by means of a small stainless steel screw press. The pH of these fresh alfalfa juices was close to pH 6. A quantity of the fresh green juice (from as little as 100 ml to as much as 2000 ml) was placed in Erlenmeyer flasks or bottles. The oxygen above the juice was displaced with nitrogen and the flask or bottle closed and sealed with a rubber stopper with a water valve or Bunsen valve which allowed gases formed during the anaerobic fermentation to escape but did not allow air to enter the vessel. In some cases a small amount of ground wheat or flour was added to the alfalfa juice to increase the carbohydrate content. As illustrated in Table 1 the pH of the green juice dropped from pH 6 to between 4.2 and 4.5 within 1 to 3 days and an olive green protein sediment or coagulum settled to the bottom. The liquid above the sediment was turbid due to suspended bacteria cells. The protein sediment or caogulum was collected by centrifuging the fermentation mixture or by syphoning off the supernatant liquid. This separation was generally done after a fermentation period of from 12 to 72 hours. However, in some experimentation the fermentation time was extended for longer periods to see how long the mixture would keep. Some gas was produced during the fermentation. When gas production had stopped the Bunsen or water valve was replaced by a tight rubber stopper for prolonged storage at room temperature. The green color of the supernatant changed from light tan to dark brown during the prolonged fermentation and storage period. This storage period has been extended to over a year and the contents of the bottles continue to show a low pH and no signs of putrefactive spoilage. In contrast, the fresh alfalfa juice samples that were left exposed to air underwent an aerobic fermentation, they showed an increase in pH within two days and signs of spoilage as indicated by an unpleasant putrid odor. Within a few days the putrid smell was so bad that the fresh juice samples that had been left exposed to air had to be discarded.

EXAMPLE 2

The experiment described in Example 1 was repeated except that the green alfalfa tissue was replaced by green leaf and stem tissue of corn (Zea mays) cut just as ears began to form. The pH of the juice of the corn decreased from 5.5 to 3.4 as illustrated in Table 1 and a protein coagulum was formed.

EXAMPLE 3

In this example the alfalfa tissue of Example 1 was replaced by green stem and leaf tissue of oats (Avena sativa) that was cut when heads were beginning to form, and the pH results were as set forth in Table 1.

EXAMPLE 4

The alfalfa tissue of Example 1 was replaced by fresh lawn grass clippings. These clippings consisted of the mixture of grasses cut from an established lawn with a rotary mower. Juice was expressed from the clippings with a screw press. Samples of the solids and supernate were taken from the lawn grass juice that had been subjected to anaerobic fermentation for 26, 50 and 74 hours. These samples and a sample of the unfermented fresh juice were hydrolyzed and analyzed for their amino acid composition. These amino acid analyses showed that the lawn grass juice that had been fermented for 26 hours contained 15% more protein as calculated from the amino acid content than the unfermented fresh juice, as illustrated in Table 1. After 50 and 74 hours this increase was 17% and 21% respectively. Thix experiment showed that some of the carbohydrate and non-protein nitrogen in the lawn grass juice had been converted into bacterial protein during the anaerobic fermentation. Thus a short anaerobic fermentation of the green plant juice will increase the amount of protein that may be recovered from the juice of green plant tissue.

EXAMPLE 5

Example 1 was repeated except that the alfalfa tissue was replaced by fresh leaf and stem tissue of the tropical grass commonly known as pangola grass (Digitoria decumbems) as set forth in Table 1. This tropical grass was grown in the greenhouse and was about 18 inches high when cut, and the results were of the same order as those of Example 1 and as illustrated in Table 1 the pH of the fresh juice decreased from 5.7 to 4.2 after 24 hours of fermentation.

EXAMPLE 6

The alfalfa tissue of Example 1 was replaced by the tropical grass known as elephant grass (Dennisetum purpureum). This grass was obtained from a local field plot. The grass was about 4 feet tall when cut. The juice which was readily expressed from the leaf and stem tissue showed good anaerobic fermentation and a protein sludge settled to the bottom of the fermentation bottle. The data in Table 1 shows the pH of the fresh juice decreased from 5.7 to 4.2 after 24 hours of fermentation.

In the examples given hereafter the juice from green plants was placed in larger glass jars instead of the smaller flasks or bottles employed in the previous examples. The experiments which were carried out in the following examples gave the same results in the decrease of the pH of the fresh juice after 24 hours of fermentation as that set forth in Table 1.

EXAMPLE 7

A larger quantity of fresh alfalfa juice was placed in cylindrical glass precipitating jars 14 cm in diameter and 46 cm high. Juice was added to a depth of 40 cm. A close fitting circular cover of particle board or polystyrene was floated on top of the juice. This floating cover prevented diffusion of oxygen into the surface of the liquid yet allowed gases formed during the fermentation to escape around the edges. The top of the jar was covered with a loose fitting plastic cover which helped to retain the fermentation gases above the liquid and to maintain anaerobic conditions. Within one or ten days the pH of the alfalfa juice dropped from about pH 6 to between pH 4.2 and 4.5. An olive tan protein coagulum settled to the bottom of the jar. The supernatant which for the first few days was very turbid due to the growth of anaerobic bacteria, slowly became less turbid and developed a brown color. There was no putrid odor or other signs of spoilage during the fifteen month period that the jars and their contents were held at room temperature. The jars with alfalfa juice then contained a thick protein coagulum or sludge to a depth of 15 cm above which was 25 cm of a brown, slightly turbid liquid.

EXAMPLE 8

The experiment described in Example 7 was repeated except the alfalfa juice was replaced by juice prepared from fresh lawn grass clippings. After the anaerobic fermentation was complete the jar contained a thick protein coagulum to a depth of 10 cm above which was 30 cm of a slightly turbid liquid. The pH of the fresh juice after 24 hours of fermentation decreased from 5.5 to 4.2 which conforms to the data set forth in Table 1.

In the following examples the fermentation process was carried out in much larger tanks and the results with respect to the pH drop conformed to the data in Table 1.

EXAMPLE 9

To determine if the anaerobic fermentation of fresh green plant juice could be conducted on a larger scale as might be required from farm operations, fermentations were done in a 100 gallon cylindrical tank 73.5 cm in diameter and 100 cm deep. The green juice in this tank was covered with a floating circular cover about 72.5 cm in diameter which was cut from ¾ inch particle board. This cover was floated on the top of the juice to prevent oxygen diffusion into the liquid and thereby maintain anaerobic conditions. In addition, a loose fitting metal lid covered the top and helped to retain the fermentation gases in the upper part of the tank. Fresh alfalfa which had been cut and chopped with farm harvesting equipment was passed through a large screw press which expressed the green alfalfa juice. 474 pounds of this fresh juice was placed in the tank and 124 pounds of inoculum which had been prepared by allowing alfalfa juice that had been expressed the day before to undergo anaerobic fermentation in milk cans closed with a Bunsen valve. The inoculum was mixed with the fresh juice which was then covered with the floating cover and allowed to undergo anaerobic fermentation for 20 hours. During this time the pH of the juice fell from 6 to between 4.2 – 4.5 and a protein coagulum formed. The entire fermentation mixture was then centrifuged in a high speed Sharples centrifuge to collect the protein coagulum. About 5 percent of the weight of the fermented mixture was collected as thick protein coagulum. This paste contained 31% total solids. Amino acid analysis showed it contained 41% protein on a dry basis.

EXAMPLE 10

Example 9 was repeated except that the protein coagulum was collected in a low speed basket centrifuge. Amino acid analysis of the protein coagulum showed it contained 39% protein on a dry basis.

EXAMPLE 11

Example 9 was repeated except that the tank was filled to a depth of 72 cm with fresh alfalfa juice containing only 5 liters of inoculum prepared from alfalfa juice that had undergone anaerobic fermentation for the previous 24 hours. After this mixture had fermented for 72 hours while covered with the floating cover, a brown turbid supernatant was separated from a thick protein sediment or sludge which had settled to the bottom. This separation was made by syphoning off the supernatant. The syphoning was done with a rubber tube and a pipe having a circular disk positioned just below the inlet which reduced the mechanical mixing of the supernatant and sediment. The depth of the supernatant layer that was syphoned off was 34 cm. The protein sediment or sludge filled the bottom part of the tank to a depth of 24 cm. Samples of the supernatant and sediment were saved for analysis. Mineral analysis of the supernatant showed it contained 4.4 percent total solids which on a dry matter basis contained 0.19 percent nitrogen, 245 ppm phosphorus and 5610 ppm potassium. Thus, the supernatant is a valuable liquid fertilizer. The thick protein sludge was stored in a cold room for feeding trials with pigs and chickens. In a further experiment to determine if the thick protein sediment would be eaten by pigs, a trough was filled with about 5 gallons of the sediment and placed before a group of nine grown pigs. These pigs had access at all times to a dry grain ration and to fresh water. The pigs readily consumed all of the fermented alfalfa sediment within a few hours after it was placed before them. They continued to eat the fermented alfalfa sediment well on each of the three consecutive days that about 5 gallons was fed. During this time they seemed to reduce their intake of water and dry food and ate the alfalfa sediment more readily on the third day than on the first day. In contrast it had been reported by other workers that when either fresh unfermented alfalfa juice or the wet head coagulated alfalfa protein coagulum was placed before the pigs, they consumed very little of either the fresh juice or heated coagulum and after a few days refused to eat either the fresh juice or heated coagulum. These experiments showed that pigs liked the taste of the fermented alfalfa juice but did not like the taste of the fresh unfermented alfalfa juice or the heat coagulated alfalfa protein. Before feeding the fermented alfalfa sediment to day old baby chicks it was necessary to dry it. Drying was done by mixing 750 cc of the fermented alfalfa protein sediment with 100 grams of starch and then drying the mixture overnight in 29 × 49 cm enamel trays in a cross-flow oven at 60° C. The fermented alfalfa sediment and starch mixture dried to a light olive green powder to which was added a vitamin and mineral mixture, 0.2% methionine and 4% glutamic acid to bring the protein content to 20%. A similar ration was made from spray dried whole alfalfa juice and from spray dried heat coagulated alfalfa protein. These three rations were fed to groups of day old chicks at the same protein level. Within one week, 80% of the chicks fed the spray dried whole alfalfa juice died. The deaths were probably due to the toxic effects of alfalfa saponins for alfalfa is very high in water soluble saponins which are toxic to chickens. The groups of chicks fed the fermented alfalfa sediment or the heat coagulated alfalfa protein grew well for the two week period of the experiment. The group fed the fermented alfalfa sediment showed slightly more weight gain than those fed the heat coagulated protein. The fermented alfalfa sediment contained 88% water from the alfalfa juice. This water would contain water soluble saponins. Because it showed no toxicity when fed to chicks, while the spray dried whole juice was very toxic, it was concluded that the anaerobic fermentation of the alfalfa juice markedly reduced the toxicity of the saponins in the alfalfa juice. The toxic saponin glycosides were probably hydrolyzed during the fermentation. Because methionine and cystine are known to be the limiting amino acids in alfalfa protein, a careful analysis was made for the amino acids methionine and cystine in fresh unfermented whole juice and in the supernatant liquid and the sediment from the anaerobic fermentation described in this Example 11. The methionine was determined by oxidation to methionine sulfone and the cystine by oxidation to cysteic acid before acid hydrolysis and ion exchange chromatography. The analyses showed that the anaerobic fermentation increased the methionine content 13% above that of the whole fresh juice. During the anaerobic fermentation much of the soluble carbohydrate and non-protein nitrogen is converted into bacterial protein. This bacterial protein is high in methionine and so the content of methionine in the mixture of alfalfa and bacterial protein is greater than that in the fresh whole alfalfa juice.

A similar amino acid analysis and comparison was made on the proteins coagulum formed by heating and by anaerobic fermentation of alfalfa. The following table sets forth the data which was collected as a result of this analysis from anaerobic fermentation which was carried out in 100 and 200 gallon tanks.

Table II

| Sample | Protein Content % Dry | GMS Amino Acid/100 Grams Total Amino Acids | | | |
|---|---|---|---|---|---|
| | | LYS | CYS | MET | LEU |
| Heated Alfalfa Concentrate (Spray dried) | 41.3 | 6.65 | 1.33 | 2.27 | 8.86 |
| Fermented Alfalfa Sludge (Spray dried) | 29.7 | 5.38 | 1.83 | 2.55 | 9.46 |
| Fermented Alfalfa (Centrifuged, washed and freeze dried) | 46.6 | 6.48 | 1.96 | 2.75 | 9.63 |

The protein coagulum obtained by fermentation contained 41% more cystine and 13% more methionine than the protein coagulum formed by heating the juice.

The following table illustrates enzymatic release of amino acids from heated spray dried protein concentrate of alfalfa and fermented oven dried sludge from alfalfa after digestion with pepsin followed by pancreatin.

TABLE III

| | GMS Amino Acid Released/100 Grams Total Amino Acids | | | | | |
|---|---|---|---|---|---|---|
| Sample | Total | LYS | CYS | MET | MET→0 | LEU |
| Heated | 17.9 | 1.77 | None | 0.24 | 6.79 | 2.51 |
| Fermented | 20.9 | 1.51 | 1.06 | 0.48 | None | 2.87 |

The above study of the hydrolysis of the fermented and heated alfalfa protein coagulum by the digestive enzymes pepsin followed by pancreatin showed that cystine was 1% of the total amino acid released from the fermented coagulum but no cystine was released from the heated coagulum. The enzymatic release of methionine from the fermented coagulum was twice that from the coagulum formed by heating. Methionine sulphoxide was released from the heated coagulum but not from the fermented coagulum. The data in Table III suggests an oxidative destruction of sulphur amino acids occurs on heating but does not occur or is reduced when anaerobic fermentation of green plants like alfalfa is employed.

The following Table IV presents data on the results of rat feeding trials showing protein eaten, gain in weight, protein efficiency ratio (P.E.R.) of casein, heated spray dried alfalfa protein concentrate and oven dried protein sludge from alfalfa at 10% protein.

Table IV

| Sample | Protein Eaten gms/2 wks. | Weight Gain gms/2 wks. | Corrected P.E.R. |
| --- | --- | --- | --- |
| Casein | 14.9 I 0.3 | 64.4 I 1.8 | 2.5 |
| Heated Protein Concentrate | 9.4 I 0.4 | 19.8 I 1.4 | 1.1 |
| Fermented Sludge | 10.2 I 0.6 | 29.2 ± 2.7 | 1.7 |

$$\text{Protein Efficiency Ratio (P.E.R.)} = \frac{\text{Gain in Weight}}{\text{Protein Eaten}}$$

The data in the above Table IV indicates that the rats which were fed the heat coagulated protein gained an average of only 19.8 grams and showed a corrected protein efficiency ration of 1.1. The rats which were fed the protein coagulated by fermentation showed a gain of 29.2 grams and a corrected protein efficiency ratio of 1.7. Consequently rat growth is greater on protein formed by anaerobic fermentation than on protein formed by heating but less than on casein, and the results were obtained even though rats do not like the taste of alfalfa.

EXAMPLE 12

The anaerobic fermentation described in Example 1 was repeated except the protein sediment or coagulum was collected by centrifugation after a fermentation period of 1, 2 and 4 days. The sediments were analyzed for xanthophyll and carotene using the method described by B. E. Knuckes, S. C. Witt, R. E. Moller, and E. M. Bickoff, *Journal of the Association of Official Analytical Chemist*, Vol. 54, pages 769–772, 1972. The analyses showed that the protein sediment collected after 1, 2 and 4 days contained 813, 736 and 763 milligrams of xanthophyll per pound of dry matter respectively. The non-epoxide xanthophyll levels were 774, 768 and 795 milligrams. The carotene content was 465, 613 and 680 milligrams per pound of dry matter after 1, 2, and 4 days of anaerobic fermentation. The analyses thus showed that the xanthophyll and carotene are not destroyed during the anaerobic fermentation. In a further experiment it was shown that the xanthophyll and carotene content of the protein concentrate prepared by the anaerobic fermentation of alfalfa juice was higher than that prepared by the usual method of heat coagulation of the protein in the same juice.

EXAMPLE 13

In this example it was shown that anaerobic fermentation may be used to preserve the wet protein coagulum that is produced by heating the green juice expressed from alfalfa, oats, corn, brome and lawn grass. The wet protein coagulum obtained by heating the expressed juice to 80° C. was placed in the lower portion of cyrovac plastic bags. These bags have a very low rate of oxygen diffusion through the plastic. The bags were evacuated to remove the air in each bag and then tied shut in two places with a soft insulated wire or string. In some cases a second bag was placed over the first to reduce oxygen leakage. The tight folds in the plastic at the area of the ties allowed the gases formed in the fermentation to slowly escape yet reduced the diffusion of air into the bag. In some cases, ground whole wheat was mixed with the wet protein coagulum in order to increase the amount of carbohydrate available for the anaerobic fermentation. The bags were stored at room temperature for periods up to 16 months with the tied portion on top to prevent leakage of liquid. Some bags were opened during this period for examination and to determine the pH of their contents. In a few cases the plastic bags cracked or developed leaks. This allowed air to leak into the bag which soon caused spoilage. However, in those bags where no leaks developed the pH of the protein coagulum dropped from an initial value of about 6 to between 3.5 and 4.5. The wet protein coagulum seemed well preserved or pickled and there was no sign of putrefaction or spoilage. Some dark brown liquid collected in the bottom of the bags. This liquid which looked and tasted like soy sauce probably represented some protein hydrolysate formed by proteolytic hydrolysis of a small part of the protein. It appeared that added carbohydrate facilitated the anaerobic preservative of the protein coagulum and the production of acid. The addition of a small amount of fermented juice or fermented coagulum as inoculum to the freshly prepared heat precipitated protein coagulum was found to increase the rate of anaerobic fermentation and aid in the preservation of the wet coagulum. The wet protein coagulum (812 gms) obtained by heating juice from fresh green oat tissue to 80°, was collected on a cloth filter and after squeezing out the free liquid was mixed with ground wheat (254 gms). This mixture was placed in cyrovac bags as described previously in this example and stored at room temperature for 16 months. The pH was then measured at 4.1. The light olive green oat protein ground wheat mass contained some brown fluid and had a pleasant odor resembling soy sauce. A portion of this wet preserved oat protein mass was mixed with about five parts of water. The mass readily dispersed in the water to give a light green turbid suspension which might be the basis for a protein rich beverage. On heating the suspension it became viscous with a smooth texture like that of puddings. The addition of some sugar reduced the sour taste arising from the low pH. Those who tasted the heated mass described it as bland, slightly tea-like, and not unpleasant. One person from a country where fermented foods are common said the fermented oat leaf protein-ground wheat mixture was very good.

In another experiment about 125 gallons of a protein sludge coagulated by heat was placed in a 200 gallon tank containing 25 gallons of a previously anaerobic fermented plant juice. The tank was closed with a floating cover to maintain anaerobic conditions. The pH dropped to about 4.5 and the sludge was preserved at room temperature for several weeks without spoilage.

By providing for the juice of leafy green plants such as those set forth in Table I to undergo an acid forming anaerobic fermentation by the bacteria naturally present on the leaves and stems of the plants from which the juice is extracted the invention obtains protein coagulation in a short space of time such as 24 hours. The process decreases the expense and reduces the energy required to precipitate protein in the juice of green plants to a coagulated state and to separate most of the water from the juice and to convert part of the carbohydrate and non-protein nitrogen in the juice into bacterial protein which increases the cystine and methionine protein content of the juice. The protein concentrate obtained by the invention is improved in taste over the concentrates produced by the use of heat or acid or organic solvents so that the concentrate is more readily eaten by animals.

The coagulated green plant juice as a feed supplement not only includes proteins from the juice which are insoluble at a pH of from 3.4 to 4.5, but in addition includes cells and proteins of acid forming anaerobic bacteria which are derived from the fermentation process. This results in an increase in the methionine and cystine content of the feed supplement and the nutritional value of the supplement. Tests have indicated that the methionine content of the feed supplement produced by anaerobic fermentation of the juice of green forage plants is in excess of two percent more than that of the methionine content of a feed supplement coagulated by heating or by adding acid to the juice.

With respect to the apparatus which has been described it is contemplated that other apparatus could be added. For example, the coagulated protein could be separated from the juice by a centrifuge rather than by gravity but this would be more expensive.

Various modes of carrying out the invention are contemplated as being within the scope of the following claims particularly pointing out and distinctly claiming the subject matter which is regarded as the invention.

I claim:

1. A process for coagulating and preserving proteins from the juices expressed from the stems and leaves of green plants, which comprises holding the freshly expressed juices in an anaerobic atmosphere for a predetermined length of time to form organic acids from the carbohydrates in the juices, and utilizing the microorganisms carried into the juices from the leaves of the green plants on which said microorganisms are naturally resident to effect anaerobic fermentation of the juices and the consequent lowing of the pH of the juices to increase the acid content of the juices and thereby coagulate the proteins in the juices.

2. The process of claim 1, and adding an inoculant providing from previously fermented green plant juices to the freshly expressed juices to promote more rapid anaerobic fermentation of the juices.

3. The process of claim 1, in which the predetermined length of time for holding the juices in the anaerobic atmosphere is up to 24 hours.

4. The process of claim 1, in which the green plant is alfalfa.

5. The process of claim 1, in which the green plant is a leafy forage grass.

6. The process of claim 1, and during the fermentation process converting part of the carbohydrate and non-protein nitrogen in the juice into bacterial protein to increase the amount of protein obtained from the juice and prevent oxidative destruction of cystine and methionine therein.

7. The method of claim 1, in which the freshly expressed juice is from green plants of recently harvested alfalfa having an acidity of the order of pH 5.7 to 6.1, and when the said juice is subjected to said anaerobic fermentation increasing the acidity of the juice to the order of pH 4.2 to 4.5, to effect coagulation of the proteins present in the juice, and then separating the coagulated proteins from the juice.

8. The method of claim 1, in which the freshly expressed juice from green plants of recently harvested forage grass having an acidity of the order of pH 5.4 to 6.1, and when the said juice is subjected to said anaerobic fermentation increasing the acidity of the juice to the order of pH 3.6 to 4.5 to effect coagulation of the proteins present in the juice, and then separating the coagulated proteins from the juice.

9. The process of claim 1, an substantially separating the coagulated proteins from the juice to provide unpressed coagulum, then preserving the unpressed coagulum by storing the unpressed coagulum in an anaerobic atmosphere.

10. A protein feed anaerobically fermented from plant juice, said juice having been expressed from fresh leafy green plants selected from the group consisting of alfalfa, corn, oats, lawn clippings, pangola grass, brome grass, elephant grass, pea vines and sudan grass and selectively having a pH as high as 6.0 as fresh juice and a pH as low as 3.4 after a predetermined time of anaerobic fermentation in which the step of the lowering of the pH of the juice is effected by utilizing the microorganisms naturally resident on the green plants from which the juice is expressed.

11. A green plant juice protein feed supplement produced by anaerobic fermentation of the fresh juice expressed from the green plants and having a composition including xanthophyll and proteins from the juice insoluble at a pH of from 3.4 to 4.5 and in addition including cells proteins of acid forming anaerobic bacteria derived from the fermentation process in which the step of lowering of the pH of the juice is effected by utilizing the microorganisms naturally resident on the green plants from which the juices are produced to thereby increase the methionine and cystine content of the feed supplement and the nutritional value of the supplement.

* * * * *

UNITED STATES PATENT AND TRADEMARK OFFICE
CERTIFICATE OF CORRECTION

PATENT NO. : 3,975,546            Page 1 of 2
DATED : August 17, 1976
INVENTOR(S) : MARK A. STAHMANN It is certified that error appears in the above-identified patent and that said Letters Patent are hereby corrected as shown below:

| | | |
|---|---|---|
| Column 1, | line 17, | Before "by" insert ---usually---; |
| Column 2, | line 59, | Cancel "mycotoxine" and substitute therefor ---mycotoxins---; |
| Column 2, | line 64, | Cancel "spills" and substitute therefor ---spoils---; |
| Column 3, | line 14, | Cancel "from" and substitute therefor ---with---; |
| Column 4, | line 2, | Cancel "material" and substitute therefor ---natural---; |
| Column 4, | line 47, | Cancel "30" and substitute therefor ---20---; |
| Column 8, | line 19, | Cancel "caogulum" and substitute therefor ---coagulum---; |
| Column 9, | line 7, | Cancel "Thix" and substitute therefor ---This---; |
| Column 9, | line 57, | Cancel "ten" and substitute therefor ---two---; |
| Column 11, | line 25, | Cancel "head" and substitute therefor ---heat---; |
| Column 15, CLAIM 1 | line 35, | Cancel "lowing" and substitute therefor ---lowering---; |

UNITED STATES PATENT AND TRADEMARK OFFICE
CERTIFICATE OF CORRECTION

PATENT NO. : 3,975,546
DATED : August 17, 1976
INVENTOR(S) : MARK A. STAHMANN

It is certified that error appears in the above-identified patent and that said Letters Patent are hereby corrected as shown below:

| | | |
|---|---|---|
| Column 15, CLAIM 2 | line 39, | Cancel "providing" and substitute therefor ---provided---; |
| Column 16, CLAIM 9 | line 20, | Cancel "an" and substitute therefor ---and---; |
| Column 16, CLAIM 11 | line 41, | After "cells" insert ---and---. |

Signed and Sealed this

Twenty-fifth Day of January 1977

[SEAL]

Attest:

RUTH C. MASON
*Attesting Officer*

C. MARSHALL DANN
*Commissioner of Patents and Trademarks*